Nov. 30, 1965        D. L. CARPENTER        3,220,382
              MAMMALIAN BIOPACK AND METHOD
Filed July 12, 1963                       2 Sheets-Sheet 1
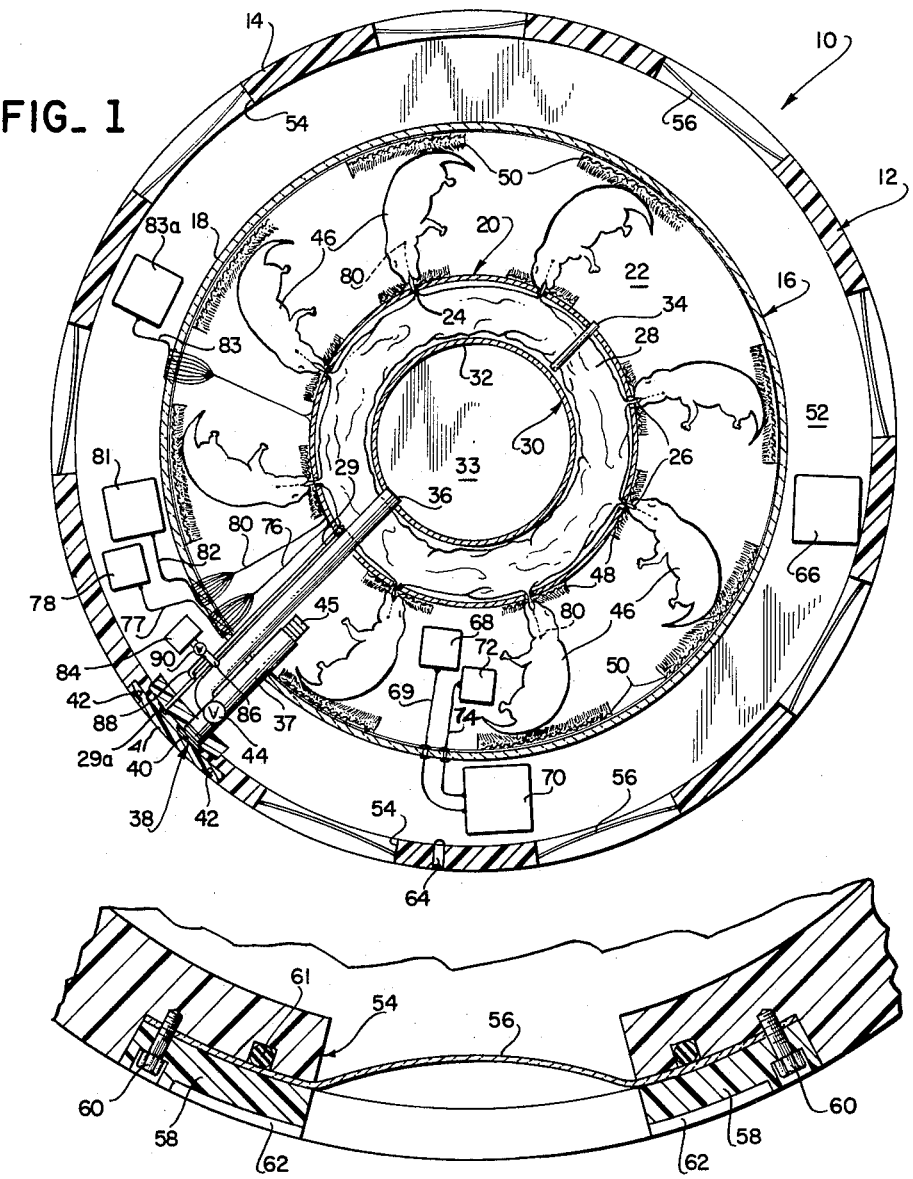
INVENTOR.
DALE L. CARPENTER
BY R. E. Geangue
Attorney Nov. 30, 1965  D. L. CARPENTER  3,220,382
MAMMALIAN BIOPACK AND METHOD
Filed July 12, 1963  2 Sheets-Sheet 2
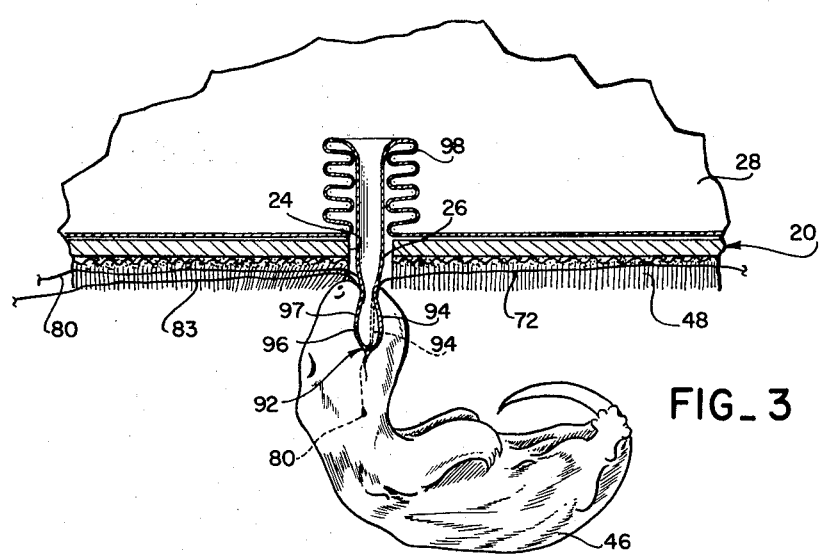
FIG_3
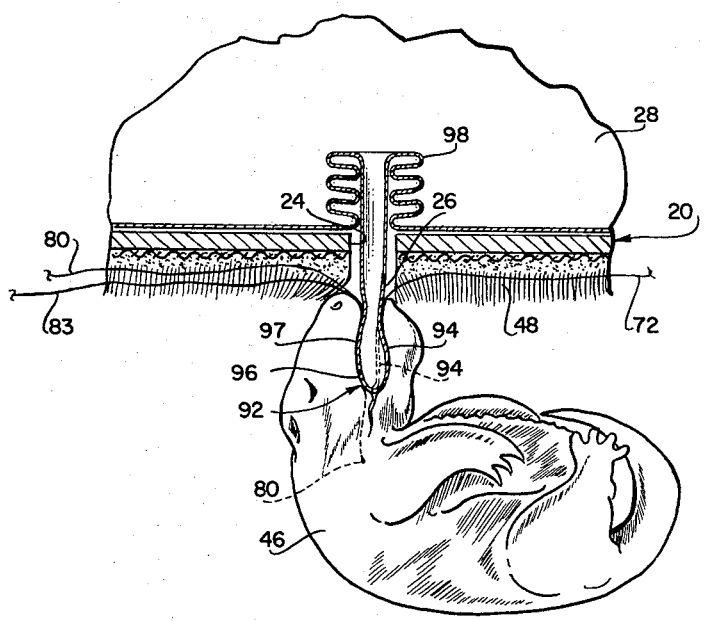
FIG_4
INVENTOR.
DALE L. CARPENTER
BY R.E. Geangue
Attorney United States Patent Office 3,220,382
Patented Nov. 30, 1965

3,220,382
MAMMALIAN BIOPACK AND METHOD
Dale L. Carpenter, Encino, Calif., assignor to The Marquardt Corporation, Van Nuys, Calif., a corporation of California
Filed July 12, 1963, Ser. No. 294,603
14 Claims. (Cl. 119—1)

This invention relates to a mammalian biopack and method, and more particularly to an apparatus and method for the external rearing of marsupial embryonic fetuses.

Present apparatus and methods for studying the effects of radiation and other environmental conditions on developing mammalian embryos and fetuses are complicated by the fact that the developing mammal must be studied in utero. It is, therefore, difficult to delineate maternal influences such as protection or deleterious effects offered the fetus or embryo.

Accordingly, it is a primary object of the present invention to provide a method and apparatus for conducting well controlled extra-uterine studies or mammalian embryonic fetuses.

Another object of the present invention is to provide a miniature mammalian biopack system for evaluating weightlessness and space radiation effects on marsupial embryonic fetuses.

Yet another object of the invention is to provide a method for the extra-uterine study of mammalian embryonic fetuses.

A still further object of the present invention is to provide a marsupial biopack in which embryonic fetal oppossums may be raised.

According to the method of the present invention, opossum embryonic fetuses are removed from the maternal pouch and are reared on an artificial nutrient supplied from a soft plastic nipple in a controlled environment outside the maternal pouch.

The apparatus of the present invention comprises a biopack of small, cylindrical shape which may be mounted in a space vehicle or a laboratory container and is essentially an artificial pouch to which embryonic fetal oppossums or other marsupial embryonic fetuses may be transferred from the natural pouch. An oxygen chamber is mounted in the center of the cylindrical pouch and is arranged so that it can be filled from outside the biopack. Suitable valving is provided so that the oxygen chamber may be closed and maintained at optimum pressure while the embryonic fetuses inside the biopack are provided with oxygen from a common external umbilical tube prior to launching or other experimental procedures. A plastic milk chamber is filled with a nutrient solution and includes attached flexible nipples. The milk chamber is housed between two rigid walls and the nipples have a flexible arrangement permitting movement of the animals. The nipples are also adapted to lengthen according to the growth and nutrition requirements of the animals, thereby simulating natural nipples. The nipples have bulbous ends which attach the embryonic fetuses to the milk chamber simulating natural conditions wherein the nipple of the mother opossum has a bulbous end so that the fetuses will not become detached from the nipples.

Felt patches are moistened with an analog of mother opossum's pouch secretions or an isotonic saline solution at the posterior and anterior of the embryo within the biopack to simulate the natural moist pouch of the maternal opossum. The felt is placed in the biopack in such a manner that viewing of the fetuses at all times is not restricted and so that maximum exposure to radiation and other environmental factors is attained. Windows are mounted in the wall of the vehicle or laboratory container to admit radiation to the interior of the biopack.

A humister and a thermistor may be connected to the biopack for determining artificial pouch humidity and temperature, respectively. Electrocardiograph (EKG) leads are attached to the nipples with a sugar glue so that sucking on the nipples will cause the glue to dissolve and the leads to pass into the lower esophageal area to monitor the heart rate of the fetuses. A $CO_2$ absorbent may be provided to maintain the $CO_2$ level within the biopack at a satisfactory level and strain gauges may be connected to the nipples to monitor sucking rate. In addition, the temperature of the fetuses can be monitored by attaching a thermistor lead to each nipple.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a transverse, cross-sectional view of a biopack of the present invention;

FIGURE 2 is a transverse, cross-sectional view, on an enlarged scale, of a portion of the device of FIGURE 1;

FIGURE 3 is an enlarged, cross-sectional view of one of the nipples of the biopack of FIGURE 1 in the mouth of a fetus during an early stage in the development thereof; and FIGURE 4 is a view similar to FIGURE 3 showing the nipple and the fetus during a subsequent stage in the development thereof.

As used herein, the term "biopack" shall mean a device for providing an artificial environment for use in biological studies.

Referring again to the drawings, and particularly to FIGURES 1 and 2, the mammalian biopack constituting the present invention, generally designated 10, includes a vehicle or laboratory container 12 having an encompassing sidewall or shell 14 in which an artificial, marsupial pouch 16 is mounted. The pouch 16 includes a cylindrical, outer wall 18 which is preferably constructed of a substantially transparent, semi-rigid material. The pouch 16 also includes a rigid, cylindrical inner wall 20 which is mounted in vehicle 12 in spaced relation with the wall 18 forming a chamber 22 therebetween. A plurality of apertures 24 are mounted in wall 20 and nipples 26 extend through the apertures 24 into chamber 22. The nipples 26 form an integral part of a nutrient-containing, torus-shaped bag 28 which may be made of a flexible material so that pressure on the outside surface of the bag 28 will cause it to collapse as the nutrient is extracted therefrom. A milk supply tube 29 is connected to the bag 28 for admitting a nutrient thereto and extends through walls 20, 18 and 14. A cap 29a is normally employed to close tube 29. A cylindrical oxygen chamber 30 having a rigid, encompassing sidewall 32 is mounted in spaced relation with wall 20 so that the bag 28 may be mounted therebetween. A bottom wall 33 extends from the sidewall 14 across the pouch 16 to close the bottom of biopack 10 and a similar wall, not shown, closes the top thereof. The sidewall 14 may also be constructed of shielding materials if weightlessness exposure is to be studied apart from space irradiation exposure.

A tubular member 34 is mounted in the wall 20 and extends through the bag 28 to a point adjacent the sidewall 32 to equalize the pressure between the space behind the bag 28 and chamber 22.

An oxygen supply conduit 36 is mounted in the pouch 16 in fluid communication with the oxygen chamber 30 which may be filled with a mixture of 21% oxygen and 79% nitrogen. The conduit 36 carries oxygen from chamber 30 to a header 37 which discharges the oxygen into chamber 22. The inlet 38 of header 37 extends through wall 14 of vehicle 12 and is normally closed with a cap 40. A plate 41 is attached to the sidewall 14 by screws 42 to cover the caps 29a and 40. A valve 44 is mounted in header 37 to control flow of gas therethrough and is normally positioned in such a manner that oxygen is free to flow from the chamber 30 through conduit 36 and header 37 into the chamber 22.

The valve 42 may also be positioned to prevent flow from chamber 30 while oxygen is being supplied to chamber 22 through an umbilical cord, not shown, which may be connected to inlet 38. A $CO_2$ absorbent 45 may be inserted through header 37 and positioned at the outlet thereof to absorb excess $CO_2$ from chamber 22. A plurality of embryonic fetuses 46 reside in chamber 22 and each is attached to a nipple 26. A first set of felt patches 48 is attached to the wall 20 adjacent the noses of the fetuses 46 and a second set of felt patches 50 is attached to the wall 18 adjacent the buttocks of the fetuses 46 and may be moistened with an isotonic saline solution or analog of mother oppossum's pouch secretions to simulate a natural moistness within the pouch 16. The felt patches 48 and 50 are preferably arranged within the pouch 16 in such a manner as not to substantially block the view of the fetuses 46 and to allow adequate exposure of the fetuses to radiation when biopack 10 is used in radiation studies.

The sidewall 14 of vehicle 12 is spaced from the pouch 16 to form an insulation chamber 52 and a plurality of radiation windows 54 are mounted in the sidewall 14 so that the fetuses 46 may be subjected to radiation. Each radiation window 54 is pressure sealed with a membrane 56 which is attached to the shell 14 by means of retaining blocks 58 and bolts 60. The membranes 56 are sealed to the shell 14 with O-rings 61. The radiation windows 54 may be closed with axially revolving, pressure-protection shutters 62 when it is desired to prevent exposure of the fetuses 46.

An evacuation valve 64 is mounted in the shell 14 to place the chamber 52 in comunication with the exterior of the vehicle 12 for evacuating chamber 52, if necessary.

A proper temperature within the pouch 16 may be maintained by a conventional, environmental temperature control system 66 of the type presently employed in space vehicles. Humidity within the chamber 22 may be sensed with a humister 68 having a lead 69 connecting it to a conventional recording or telemetry device 70 which may be mounted within the chamber 52. Temperature in the chamber 22 is sensed by means of a thermistor 72 which is connected to the recording or telemetry device 70 by a lead 74. The temperature of each embryonic fetus 46 may be determined by connecting a thermistor lead 76 to the tip of each nipple 26 (FIGURES 3 and 4) and a lead 77 connects the leads 76 to a conventional temperature monitoring or telemetry mechanism 78 mounted within the chamber 52. The heart beat of the embryonic fetuses 46 may be recorded by connecting one lead 80 of an electrocardiograph to each nipple 26 with sugar glue so that the lead may be sucked by the animal into the lower esophageal area adjacent the heart (FIGURES 3 and 4). The leads 80 are then connected to a common posterior electrocardiograph lead 82 which is connected to the electrocardiograph 81. The electrocardiograph 81 may be mounted in the chamber 52. Also, a strain gauge 83 may be connected to each nipple 26 to monitor the sucking rate on each nipple on a monitor or telemetry device 83a.

A container 84 for a suitable preservative or fixing solution, such as formalin or a cryogenic gas, is mounted in the chamber 52 and is connected to the oxygen supply pipe 36 with a short conduit 86 and to the milk supply tube 29 with a short conduit 88. Flow through the pipes 86, 88 is controlled with a normally closed valve 90. If there is a need to stop development of the embryonic fetuses 46 at any particular stage, the valve 90 may be opened permitting flow of the preservative from container 84 into the milk bag 28 and the chamber 22.

Referring now to FIGURES 3 and 4, each nipple 26 is provided with a bulbous end 92 which has a flexible sidewall portion 94 adapted to expand and fill the oral cavity of the fetus 46 as nutrient is drawn from the bag 28. Nutrient is drawn from the bag 28 and discharged through an orifice 96 which is mounted in the sidewall 97 of the nipple 26. Each nipple 26 is connected to the bag 28 with a cylindrical, bellows-type connection 98 so that the nipple 26 is free to extend in length as the fetus 46 matures and as the bulbous end 92 becomes larger in size, as shown in FIGURE 4.

The fetuses shown for purposes of illustration, but not of limitation, are oppossum. The newborn oppossum is initially in a very immature state, and part of the embryonic development takes place post-birth after the embryos are self-attached to the mother's nipples within the protective pouch. The nipples of the mother oppossum are about the size of the head of a common pin normally, and after parturition the thirteen mammary glands continue to enlarge. When the soft nipple is sucked through the narrow opening to the mouth of the fetus, the nipple swells up in the oral cavity of the young and "buttons" the young to the mother. The nasopharynx and mouth structure of the fetuses are such that the fetuses can breath and nurse while attached to the nipples. The more the nipple is sucked on, the more enlarged it becomes at the tip. When the young are sixty days of age, the mammary glands of the mother are each ten to fifteen mm. in diameter and, by the seventieth day, they fill the floor of the pouch. At eighty days, the mammary glands extend from groin to groin. During the enlargement of the mammary glands, the nipples increase in length from pin head size at parturition to six or eight mm. after one week; twelve to fifteen mm. by the twentieth day; and by the fiftieth day, the nipples are so long that the young are able to move to any part of the pouch without releasing the nipple. The nipple 26 shown in FIGURES 3 and 4 is designed to imitate these conditions as nearly as possible. An oppossum may produce a litter of up to 22 fetuses. Since there are only thirteen available nipples, only that number can survive. With the biopack of the present invention, on the other hand, as many nipples as are needed for an entire litter may be provided.

Although the pouch 16 has been shown, for purposes of illustration but not of limitation, as constituting a part of a vehicle so that space parameters such as weightlessness and radiation may be tested on developing mammal fetuses, it is to be understood that the pouch 16 may be used separate from the vehicle 12 and connected to any number of suitable instruments in a laboratory for subjecting the embryonic fetuses 46 to different types of environment and testing the results thereof.

An example of the method of the invention is as follows:

A 33-day old male oppossum embryonic fetus bred and born in captivity was detached from the mother's nipple by kneading the teat from its proximal end to its distal end near the fetal mouth. In other words, the mother's teat was "stripped down" in much the manner that a cow's teat is stripped in milking her. The embryonic fetus was allowed to continue sucking until the nipple appeared to collapse in its mouth.

The fetus was then removed by gentle traction and allowed to attach itself to a sterilized plastic nipple which was connected through plastic couplers to a small, sterilized collapsible bag containing 50% lactum (a commercial formula for feeding human infants) and 50% sterile water. The plastic milk chamber was enclosed in a temperature-controlled water bath. The oppossum was placed in an oxygen air lock with ambient air provided at the rate of 8 liters per minute under one atmosphere of pressure. A heating unit maintained a contant environmental temperature of 33.5 degrees C. and the humidity was maintained at a relatively high level by keeping a humidifying pan full of water.

The opossum remained attached to the artificial nipple as long as a constant supply of nutrient was available. Its sucking rate varied from approximately 30-second intervals to continuous sucking.

On the fifteenth day, the 50% lactum–50% water mixture was exhausted and the nutrient was changed to homogenized-pasteurized cow's milk. The opossum embryonic fetus had been urinating daily up to this time. After the nutrient was changed to cow's milk, the opossum ceased to urinate, grew weak and died one day later.

The embryonic fetus was weighed daily during the experiment and ranged from 36.1 to 40.2 grams. A sibling was removed from the mother's nipple at the time of the experimental opossum's death and its weight was 50 grams as compared to 40.2 grams for the experimental opossum. However, the experimental opossum appeared more mature in physiological characteristics than its sibling which had remained in the mother's pouch. The experimental animal's eyes were opened wide and it occasionally vocalized in a shrill tone. Its hind legs appeared to be slightly more developed than the sibling remaining in the pounch.

While the particular mammalian biopack and method herein shown and described in detail are fully capable of attaining the objects and providing the advantages hereinbefore stated, it is to be understood that they are merely illustrative of the presently preferred apparatus and method of the invention and that no limitations are intended to the details of construction, design or method steps herein shown and described other than as defined in the appended claims.

What is claimed is:

1. A method for the extra-uterine rearing of mammals comprising the steps of:
    detaching a marsupial, embroynic fetus from its mother's nipple;
    attaching said embryonic fetus to an artificial nipple; and
    supplying a nutrient to the nipple.

2. The method of claim 1 wherein said nutrient comprises a mixture of 50% by weight of lactum and 50% by weight of sterile water.

3. A method for the extra-uterine rearing of mammals comprising the steps of:
    detaching a marsupial, embryonic fetus from its mother's nipple and pouch;
    attaching said embryonic fetus to an artificial nipple in an artificial pouch; and
    supplying a nutrient to said nipple.

4. An artificial pouch for rearing a marsupial, embryonic fetus comprising:
    a chamber for housing said marsupial embryonic fetus;
    an extensible nipple having a bulbous end adapted to swell up in the oral cavity of said fetus, extending into said chamber; and
    a container connected to said nipple for supplying an artificial nutrient thereto.

5. The pouch of claim 4 including moistened pads mounted in said chamber for simulating natural pouch humidity.

6. In a biopack for providing an artificial environment for a mammalian, embryonic fetus, the combination comprising:
    a chamber for housing said fetus;
    a nipple mounted in said chamber;
    a marsupial, embryonic fetus attached to said nipple in said chamber; and
    means for supplying a nutrient to said nipple.

7. The combination of claim 6 including a pad in said chamber, said pad being moistened with an isotonic, saline solution to humidify said chamber.

8. The combination of claim 6 including a vehicle housing said chamber, said vehicle being adapted to launch said biopack into orbit and subject said fetus to space environment.

9. The combination of claim 8 including radiation windows mounted in said vehicle for exposing said fetus to said radiation.

10. The combination of claim 8 including an electrocardiograph lead connected to said nipple for sensing the heartbeat of said fetus.

11. The combination of claim 8 including a thermistor lead connected to said nipple for sensing the temperature of said fetus.

12. The combination of claim 8 including a strain gauge connected to said nipple for indicating the sucking rate of said fetus.

13. The combination of claim 6 wherein said nipple comprises:
    an extensible bellows, one end of which is secured to a wall of said chamber;
    a conduit connected to the opposite end of said bellows; and
    a bulbous terminus communicating with the other end of said conduit and adapted to swell up in the oral cavity of said fetus.

14. In a biopack for providing an artificial environment for mammalian, embryonic fetus, the combination comprising:
    a chamber for housing said fetus;
    a nipple mounted in said chamber; and
    means for supplying a nutrient to said nipple.

References Cited by the Examiner

UNITED STATES PATENTS

| | | | |
|---|---|---|---|
| 2,633,842 | 4/1953 | Higgs | 128—1 |
| 2,723,660 | 11/1955 | Greenberg | 128—1 |
| 2,881,733 | 4/1959 | Young et al. | 119—15 |
| 2,905,143 | 9/1959 | Atchley | 119—71 |
| 3,005,673 | 10/1961 | Smith et al. | 312—270 |
| 3,010,220 | 11/1961 | Shueller | 128—1 |
| 3,043,265 | 7/1962 | Atchley | 119—71 |

SAMUEL KOREN, *Primary Examiner.*

ALDRICH F. MEDBERY, *Examiner.*